(12) United States Patent
Penn et al.

(10) Patent No.: US 9,636,825 B2
(45) Date of Patent: May 2, 2017

(54) ROBOTIC LOGISTICS SYSTEM

(71) Applicant: RoboteX Inc., Jerseyville, IL (US)

(72) Inventors: Taylor J. Penn, Mountain View, CA (US); Andrew G. Stevens, Palo Alto, CA (US); Gabriella L. Seal, Pasadena, CA (US); Eric D. Ivers, Sunnyvale, CA (US)

(73) Assignee: RoboteX Inc., Jerseyville, IL (US)

( * ) Notice: Subject to any disclaimer, the term of this patent is extended or adjusted under 35 U.S.C. 154(b) by 0 days.

(21) Appl. No.: 14/749,218

(22) Filed: Jun. 24, 2015

(65) Prior Publication Data

US 2015/0375398 A1  Dec. 31, 2015

Related U.S. Application Data

(60) Provisional application No. 62/017,719, filed on Jun. 26, 2014.

(51) Int. Cl.
| | |
|---|---|
| *B25J 13/08* | (2006.01) |
| *B25J 9/16* | (2006.01) |
| *G06Q 10/08* | (2012.01) |
| *B25J 19/02* | (2006.01) |
| *B25J 5/00* | (2006.01) |
| *B65G 1/137* | (2006.01) |
| *G05D 1/00* | (2006.01) |

(52) U.S. Cl.
CPC .............. *B25J 9/1697* (2013.01); *B25J 5/005* (2013.01); *B25J 13/08* (2013.01); *B25J 13/089* (2013.01); *B25J 19/021* (2013.01); *B65G 1/1375* (2013.01); *G05D 1/0027* (2013.01); *G06Q 10/083* (2013.01); *G05B 2219/40099* (2013.01); *G05B 2219/40123* (2013.01); *G05B 2219/40153* (2013.01); *G05D 2201/0216* (2013.01); *G06Q 10/087* (2013.01); *Y10S 901/01* (2013.01); *Y10S 901/47* (2013.01)

(58) Field of Classification Search
CPC .......... B25J 9/1697; B25J 5/005; B25J 13/08
See application file for complete search history.

(56) References Cited

U.S. PATENT DOCUMENTS

| | | | |
|---|---|---|---|
| 6,535,793 B2 | 3/2003 | Allard | |
| 6,584,375 B2 * | 6/2003 | Bancroft | ................. A47F 10/00 235/383 |

(Continued)

FOREIGN PATENT DOCUMENTS

WO   WO 2014/138472   9/2014

*Primary Examiner* — Thomas Randazzo
(74) *Attorney, Agent, or Firm* — Levine Bagade Han LLP

(57) ABSTRACT

A robotic logistics system is disclosed. The system includes multiple robots each having an image capture unit and a server communicatively coupled to the multiple robots. The server is configured to transmit a location of a first item to a first robot and the location of a second item to a second robot; track the positions of the first robot and the second robot; transmit a first image of the first item captured by the first robot to an operator device; receive a first verification signal from the operator device in response to the first image; transmit a second image of the second item captured by the second robot to the operator device; and receive a second verification signal from the operator device in response to the second image.

20 Claims, 8 Drawing Sheets

(56) References Cited

U.S. PATENT DOCUMENTS

| | | | |
|---|---|---|---|
| 7,693,757 B2* | 4/2010 | Zimmerman | G06Q 10/00 235/462.11 |
| 7,818,091 B2* | 10/2010 | Kazi | B25J 9/1697 318/568.1 |
| 8,100,205 B2 | 1/2012 | Gettings et al. | |
| 8,805,573 B2* | 8/2014 | Brunner | G06Q 10/08 700/213 |
| 8,867,819 B2* | 10/2014 | Calio | G06Q 10/087 382/153 |
| 8,983,647 B1* | 3/2015 | Dwarakanath | G06Q 10/087 700/216 |
| 8,996,176 B2* | 3/2015 | Kondo | B25J 9/1697 348/169 |
| 9,020,636 B2* | 4/2015 | Tadayon | B25J 5/02 700/247 |
| 9,050,888 B2 | 6/2015 | Gettings et al. | |
| 9,111,313 B2* | 8/2015 | Chirnomas | B65G 1/1373 |
| 9,205,886 B1* | 12/2015 | Hickman | G05D 1/0246 |
| 2008/0109114 A1* | 5/2008 | Orita | B25J 19/005 700/248 |
| 2010/0171826 A1* | 7/2010 | Hamilton | G06Q 30/06 348/135 |
| 2011/0153079 A1* | 6/2011 | Jung | G05B 19/41865 700/248 |
| 2012/0072023 A1* | 3/2012 | Ota | B25J 9/1664 700/259 |
| 2012/0215358 A1* | 8/2012 | Gettings | B25J 5/005 700/259 |
| 2013/0036043 A1* | 2/2013 | Faith | G06Q 30/06 705/39 |
| 2014/0330425 A1* | 11/2014 | Stevens | G06Q 10/087 700/216 |
| 2015/0379347 A1* | 12/2015 | Mishra | G06K 9/00577 348/143 |

* cited by examiner

ROBOTIC LOGISTICS SYSTEM

CROSS-REFERENCE TO RELATED APPLICATIONS

This application claims priority to U.S. Provisional Application No. 62/017,719, filed on Jun. 26, 2014, the content of which is incorporated herein by reference in its entirety.

TECHNICAL FIELD

This disclosure relates generally to the field of robotics and more specifically, to a robotic logistics system.

BACKGROUND

The growth of online shopping has made the efficient and accurate fulfillment of customer orders a priority for online retailers and brick-and-mortar retailers with an online presence. Recently, fulfillment centers and warehouses supporting such retailers have begun to use robots to optimize order retrieval and delivery. These robots can include autonomous robots which operate without human intervention, remotely-controlled robots which operate through human guidance, or semi-autonomous robots which benefit from periodic or occasional human guidance.

While systems which rely exclusively on autonomous robots are often highly efficient, the inability of such robots to troubleshoot or solve problems on-the-fly often result in bottlenecks or inadvertent errors which can go undetected in order processing. On the other hand, systems which rely on robots controlled by a human operator are often hampered by the speed and availability of such operators. Thus, a logistics solution is needed which rely on the productivity and efficiency of robots but also benefit from high-level inputs from one or more human operators.

In addition, orders through online channels may include items stored in a variety of warehouses or inventory locations. Therefore, this logistics solution should also account for the dispersed nature of modern supply chain operations. In view of the ever-increasing commercial competitive pressures and growing customer expectations, it is increasingly critical that answers be found to these problems.

SUMMARY

A robotic logistics system is disclosed. The robotic logistics system can include a first robot having a first image capture unit, a second robot having a second image capture unit, and a server having a control unit coupled to a communication unit.

The server can be configured to transmit, through the communication unit, a location of a first item to the first robot and the location of a second item to the second robot. The server can be configured to track, using the control unit, a position of the first robot relative to the first item and the position of the second robot relative to the second item. The server can be configured to transmit, through the communication unit, a first image of the first item captured by the first image capture unit to an operator device when the first robot arrives at the location of the first item. The operator device can be a mobile phone or a tablet operated by a consumer, possibly through a consumer point-of-sale (P.O.S.) terminal in a retail location, or the operator device can be a video game device or terminal, or a personal mobile device, such as a phone, tablet, or laptop computer.

The server can also be configured to receive, through the communication unit, a first verification signal from the operator device in response to the first image. The server can be configured to transmit, through the communication unit, a second image of the second item captured by the second image capture unit to the operator device when the second robot arrives at the location of the second item. The server can also be configured to receive, through the communication unit, a second verification signal from the operator device in response to the second image.

The first robot can include a reader configured to read an identification code in a storage environment. The server can be configured to receive a reading of the identification code from the first robot, and track, using the control unit, the position of the first robot based on the reading of the identification code relative to other instances of the identification code in the storage environment.

The first robot can include a beacon receiver configured to detect a beacon signal emitted by a beacon transmitter in a storage environment. The server can be configured to receive the beacon signal detected by the first robot, and track the position of the first robot based on the beacon signal relative to other beacon signals emitted by other beacon transmitters in the storage environment.

The first verification signal from the operator device can be a rejection signal and the server can be configured to transmit, through the communication unit, the first image of the first item to another operator device. The server can be configured to transmit, through the communication unit, an approved image of the first item to the operator device, and receive, through the communication unit, a verification signal from the operator device based on a comparison of the control image and the first image of the first item.

The server can also be configured to determine, using the control unit, a priority level of at least one of the first item and the second item, calculate, using the control unit, a proximity of the first robot to at least one of the first item and the second item and the proximity of the second robot to at least one of the first item and the second item, and transmit, through the communication unit, the location of at least one of the first item and the second item to at least one of the first robot and the second robot based on the calculation of the proximity.

The first item and the first robot can be located in a first storage environment and the second item and the second robot can be located in a second storage environment geographically separated from the first storage environment. The server can be located in a server location and the operator device can be located in an operator location geographically separated from the server location.

The server can be located in a server location, the first item and the first robot can be located in a first storage environment, the second item and the second robot can be located in a second storage environment, and the operator device can be located in an operator location, and the server location, the first storage environment, the second storage environment, and the operator location can be geographically separated from one another. The server can also be operated entirely on a computer of a single robot, or the server can be distributed across a plurality of robots.

The first robot can include an end effector configured to retrieve the first item and the first image capture unit can be positioned on the end effector. The end effector can include a vacuum, a claw, a gripper, a scoop a basket, a fork, a poker, a magnet or electromagnet, or any other suitable end effector.

DETAILED DESCRIPTION OF THE INVENTION

Figure 1:
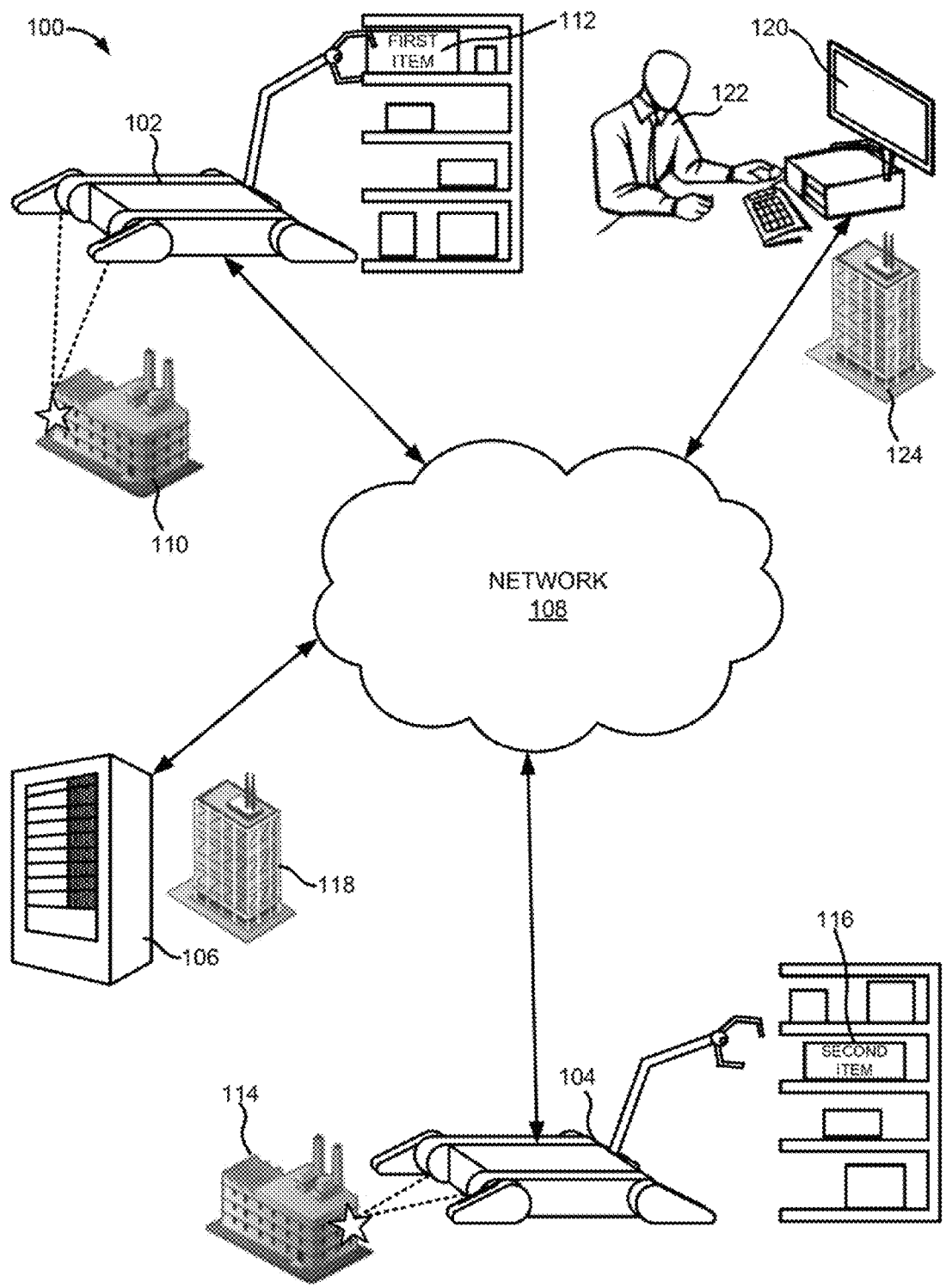
FIG. 1 illustrates a robotic logistics system.

FIG. 1 illustrates a robotic logistics system 100 having a first robot 102, a second robot 104, and a server 106 communicatively coupled to the first robot 102 and the second robot 104. The server 106 can be communicatively coupled to the first robot 102, the second robot 104, or a combination thereof through a network 108.

The network 108 can include a cellular network such as a 30 network, a 40 network, a long-term evolution (LTE) network, a sonic communication network, a WiFi network, a wide area network, a metropolitan area network, a closed circuit network, an intranet, a local area network, a personal network, a combination thereof or a portion therein. The network 108 can include wired connections, wireless connections, or a combination thereof. The first robot 102, the second robot 104, and the server 106 can be connected to the network 108 through wired connections, wireless connections, or a combination thereof.

The server 106 can be a centralized server or a de-centralized or cloud server. For example, the server 106 can be a cluster server, a part of a server farm, or a combination thereof. The server can be a rack mounted server, a blade server, a mainframe, a dedicated desktop or laptop computer, or a combination thereof. The server can be a virtualized computing resource, a grid computing resource, a peer-to-peer distributed computing resource, or a combination thereof. The server 106 can also be operated entirely on a computer of a single robot 102, or the server 106 can be distributed across a plurality of robots 102, 104, that can communicate across a network 108.

While the disclosure is implemented in certain variations using the first robot 102 and the second robot 104, it should be understood by one of ordinary skill in the art that any number of robots can be communicatively coupled to the server 106 through the network 108.

The first robot 102 can be located in a first storage environment 110. The first storage environment 110 can include a warehouse, a fulfillment center, a shipping center, an inventory storage, a wholesale store, a retail store, or a combination thereof. The first storage environment 110 can include a first item 112. The first item 112 can be a package, a box, a mailing item, a good, a product, a food item, a piece of merchandise, an article of clothing, or a combination thereof.

The second robot 104 can be located in a second storage environment 114. The second storage environment 114 can include a warehouse, a fulfillment center, a shipping center, an inventory storage, a wholesale store, a retail store, or a combination thereof. The second storage environment 114 can include a second item 116. The second item 116 can be a package, a box, a mailing item, a good, a product, a food item, a piece of merchandise, an article of clothing, or a combination thereof.

The second storage environment 114 can be geographically separated from the first storage environment 110. The server 106 can be located in a server location 118. The server 106, the first robot 102, the second robot 104, or a combination thereof can be communicatively coupled to an operator device 120 through the network 108. The operator device 120 can be coupled to the network 108 through a wired connection, a wireless connection, or a combination thereof.

The operator device 102 can receive inputs from an operator 122. The operator device 102 and the operator 122 can be located at an operator location 124. The operator location 124 can be geographically separated from the server location 118. The server location 118, the first storage environment 110, the second storage environment 114, and the operator location 124 can be geographically separated from one another. The operator device 102 can be a mobile phone or a tablet operated by a consumer, possibly through a consumer purchasing terminal in a retail location, or the operator device 102 can be a video game device or terminal, or a personal mobile device, such as a phone, tablet, or laptop computer.

The first robot 102 or the second robot 104 can include ground robots, which can contain articulating flippers, manipulator arms, and move via tracks, continuous tracks, rails, wheels, cables or gantry systems, which can be powered by electric motors, hydraulic motors, gasoline, or diesel engines, or pneumatic actuators. They can also include aerial robots, which can contain wings, lighter-than-air-gases, or propellers, and move via propellers, ducted fans, or jet engines. The robots 102, 104 can be robots manufactured by RoboteX, Inc. and of the type disclosed in U.S. Pat. No. 8,100,205 entitled "Robotic System and Method of Use" and U.S. Pat. No. 9,050,888 entitled "Robotic System and Methods of Use" and in U.S. patent application Ser. No. 14/676,431 entitled "Infrastructure for Robots in Human Centric Environments" and Patent Cooperation Treaty Application PCT/US14/21391 entitled "System and Method for Collecting and Processing Data and for Utilizing Robotic and/or Human Resources" the content of which are incorporated herein by reference in their entirety.

Figure 2:
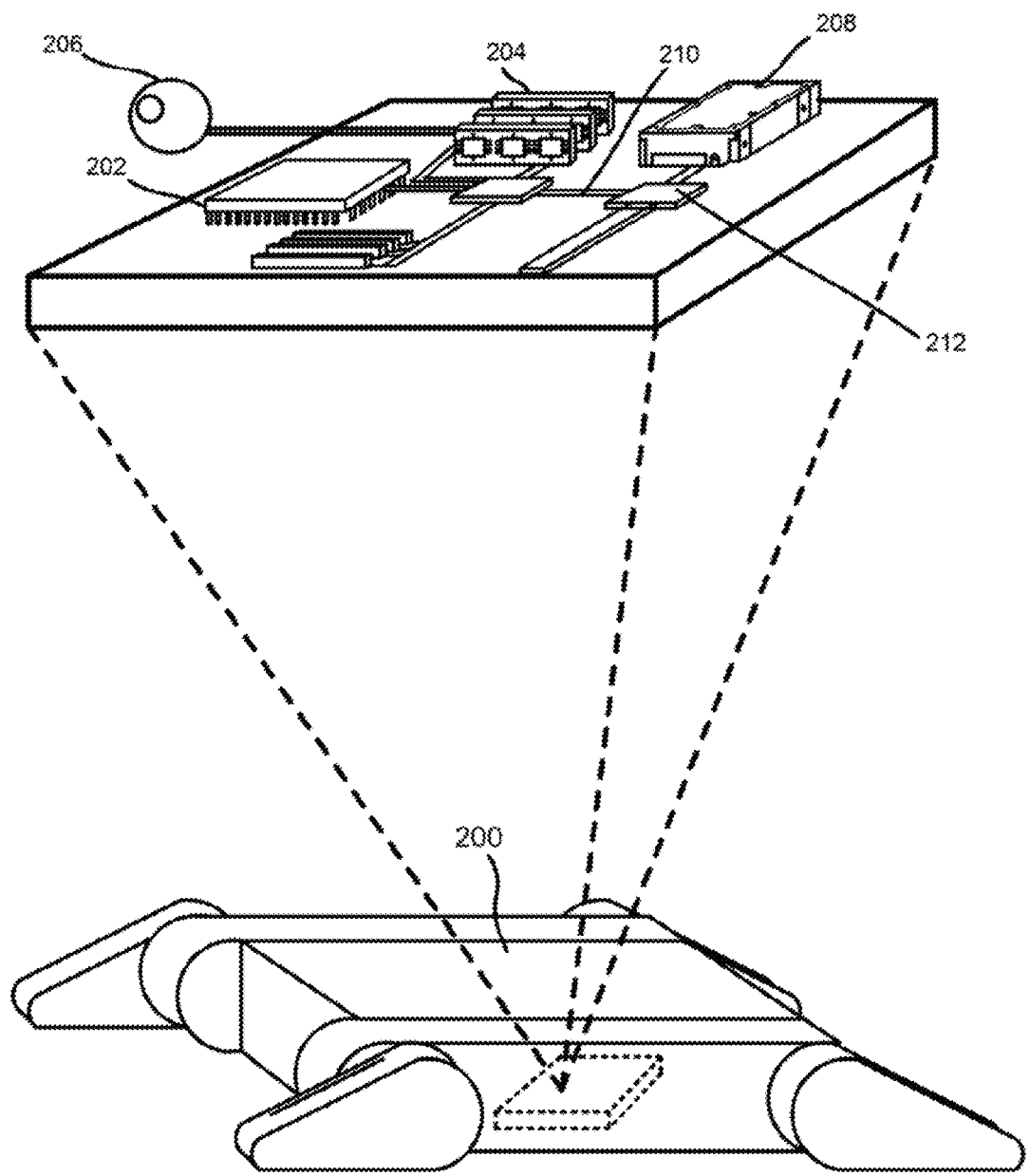
FIG. 2 illustrates a robot of the robotic logistics system.

FIG. 2 illustrates that a robot 200 of the robotic logistics system 100 can have one or more processors 202, memory 204, an image capture unit 206, and a communication unit 208. The processors 202, the memory 204, the image capture unit 206, the communication unit 208, or a combination thereof can be coupled to one another through high speed buses 210. The robot 200 can be any of the first robot 102 or the second robot 104.

The processors 202 can include one or more central processing units (CPUs), graphical processing units (GPUs), Application-Specific Integrated Circuits (ASICs), field-programmable gate arrays (FPGAs), or a combination thereof. The processor 202 can execute software stored in the memory 204 to provide the intelligence of the robot 200. The processors 202 can be implemented in a number of different manners. For example, the processors 202 can be an embedded processor, a processor core, a microprocessor, a logic circuit, a hardware finite state machine (FSM), a digital signal processor (DSP), or a combination thereof.

The memory 204 can store software, data, logs, or a combination thereof. The memory 204 can be an internal memory. Alternatively, the memory 204 can be an external memory, such as a memory residing on a storage node or a storage server. The memory 204 can be a volatile memory, a non-volatile memory, or a combination thereof. For example, the memory 204 can be a nonvolatile storage such as non-volatile random access memory (NVRAM), Flash memory, disk storage, or a volatile storage such as static random access memory (SRAM). The memory 204 can be the main storage unit for the robot 200.

The communication unit 208 can include one or more wireless communication interfaces. For example, the communication unit 208 can include a wireless modem, a WiFi modem, a 3G modem a 4G modern, an LTE modem, a Bluetooth™ component, a radio receiver, an antenna, or a combination thereof. The robot 200 can couple with the network 108 of FIG. 1 through the communication unit 208.

The image capture unit 206 can be implemented as one or more two-dimensional (2D) cameras, three-dimensional (3D) cameras, video cameras, stereoscopic cameras, optical sensors, low-light cameras, IR sensors, UV sensors, thermal imaging cameras, or a combination thereof. In addition, the image capture unit 206 can include a depth sensor, a motion sensor, an active pixel sensor, a charge-coupled sensor, a CMOS sensor, or a combination thereof. When the image capture unit 206 is a 2D camera, the robot 200 can use its processors 202 to calculate a size, a shape, or a distance of an object using a computer vision algorithm.

The robot 200 can also include a locational unit 212. The locational unit 212 can include be a part of a global positioning system (GPS), an inertial navigation system, a magnetometer, a compass, or any combination thereof. In addition, the locational unit 212 can also be implemented as a multi-axis accelerometer including a three-axis accelerometer, a multi-axis gyroscope including a three-axis MEMS gyroscope, or a combination thereof.

Figure 3:
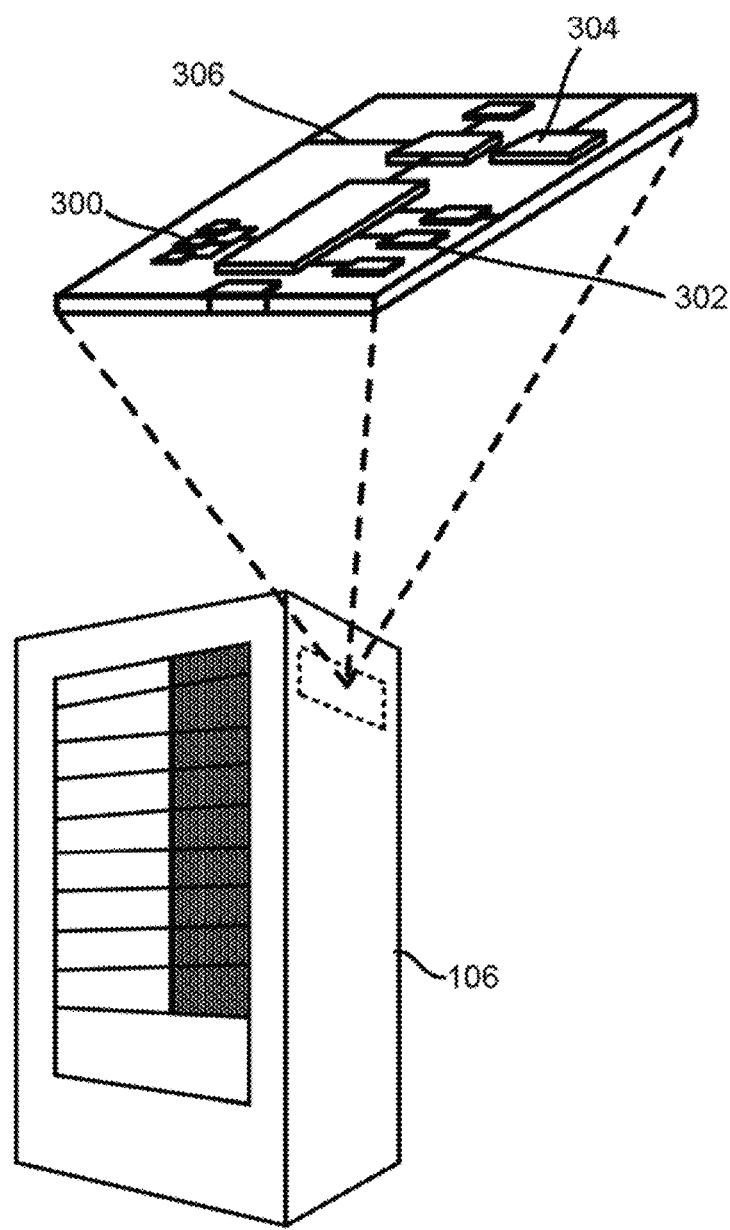
FIG. 3 illustrates a server of the robotic logistics system.

FIG. 3 illustrates that the server 106 can include a control unit 300, a memory 302, and a communication unit 304. The control unit 300 can be coupled to the memory 302 and the communication unit 304 through one or more high-speed buses 306. The control unit 300 can include one or more central processing units (CPUs), graphical processing units (GPUs), Application-Specific Integrated Circuits (ASICs), field-programmable gate arrays (FPGAs), or a combination thereof. The control unit. 300 cart execute software stored in the memory 302 to provide the intelligence of the server 106. The control unit 300 can be implemented in a number of different manners. For example, the control unit 300 can be an embedded processor, a processor core, a microprocessor, a logic circuit, a hardware finite state machine (FSM), a digital signal processor (DSP), or a combination thereof.

The memory 302 can store software, data, logs, or a combination thereof. The memory 302 can be an internal memory. Alternatively, the memory 302 can be an external memory, such as a memory residing on a storage node or a storage server. The memory 302 can be a volatile memory, a non-volatile memory, or a combination thereof. For example, the memory 302 can be a nonvolatile storage such as non-volatile random access memory (NVRAM), a solid-state drive (551)), Flash memory, disk storage, or a volatile storage such as static random access memory (SRAM). The memory 302 can be the main storage unit for the server 106.

The communication unit 304 can include one or more wireless communication interfaces. For example, the communication unit 304 can include a wireless modem, a WiFi modem, a 30 modem, a 40 modem, an LTE modem, a Bluetooth™ component, a radio receiver, an antenna, or a combination thereof. The server 106 can couple with the network 108 of FIG. 1 through the communication unit 304.

Figure 4:
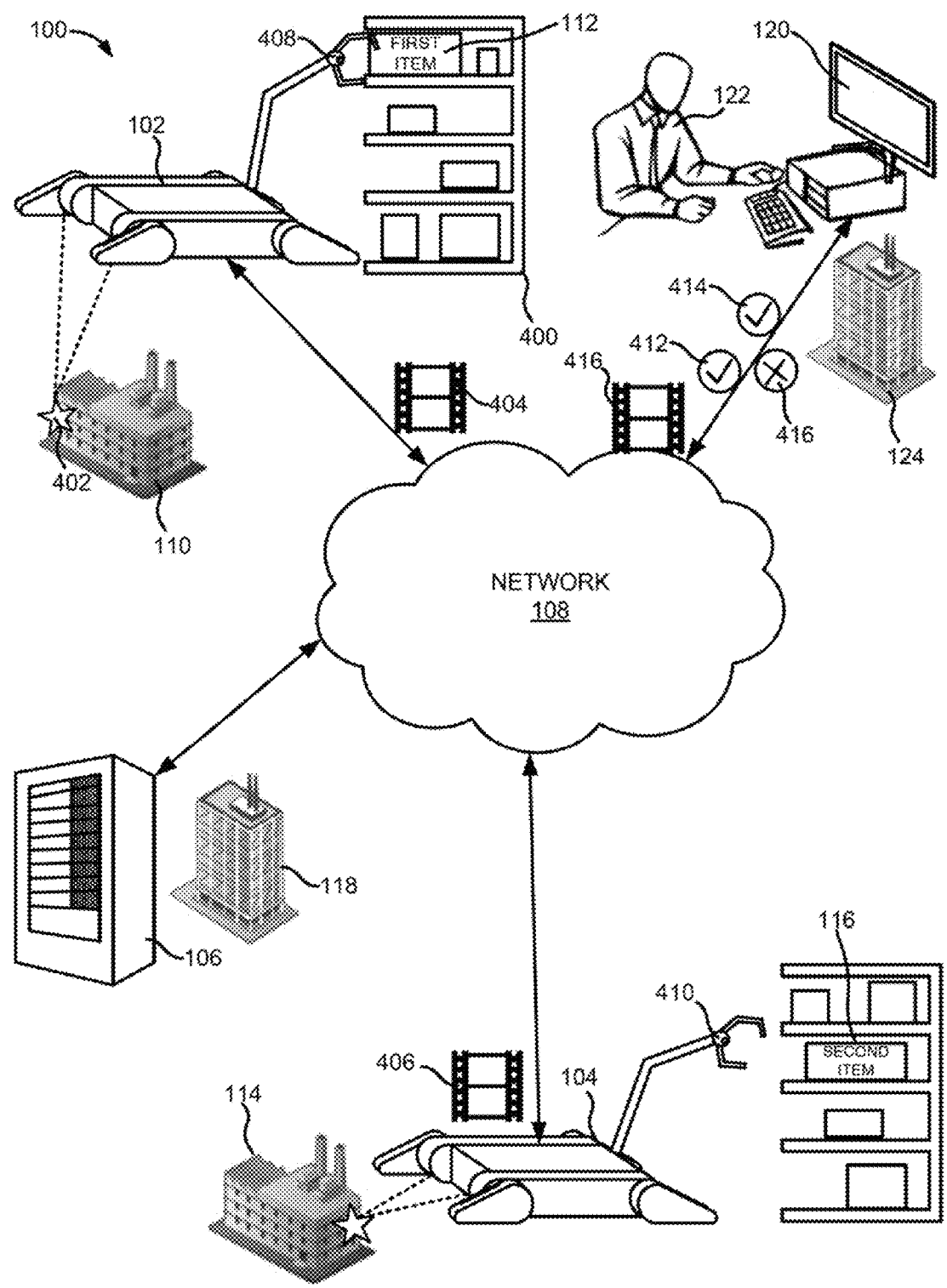
FIG. 4 illustrates the robotic logistics system in operation.

FIG. 4 illustrates that the server 106 can be configured to transmit, through the communication unit 304, a location 400 of the first item 112 to the first robot 102 and the location 400 of the second item 116 to the second robot 104. The server 106 can be configured to track, using the control unit 300, the position 402 of the first robot 102 relative to the first item 112 and the position 402 of the second robot. 104 relative to the second item 116. Tracking of the first robot 102 and the second robot 104 will be discussed in detail below.

The server 106 can also be configured to transmit, through the communication unit 304, a first image 404 of the first item 112 captured by a first image capture unit 408 of the first robot 102 to the operator device 120 when the first robot 102 arrives at the location 400 of the first item 112. The first image 404 can be one or inure frames in a digital or analog image format, including but not limited to: JPG, GIF, BMP, RAW, TIFF, and PNG, or digital or one or more frames in a digital or analog video format, including but not limited to: MPEG-2, H.264, X.264, AVI, MJPEG, MP4, HTML5, GIF, and Theora. It can also include depth information to allow the operator to see a 3D view of the object or feel its texture. Image capture can also be more broadly defined, such that an image can actually comprise high quality depth data (e.g. lidar, radar) can be used to create a mapping of a 3-d surface and select an item based on said mapping or verifying items such as mechanical parts like bolts, screws, nuts, and measuring tolerances to verify that apart is the correct size.

The server 106 can also be configured to receive, through the communication unit 304, a first verification signal 412 from the operator device 120 in response to the first image 404. The verification signal can be a simple yes/no answer as to whether the item in the image is the intended item. It can also be a multiple choice answer, selecting among one or more options posed by the server (including none of the above), regarding possible items in the image. It can also be text or audio describing what is in the image or is not in the image. The server 106 can be configured to transmit, through the communication unit 304, a second image 406 of the second item 116 captured by a second image capture unit 410 of the second robot 104 to the operator device 120 when the second robot 102 arrives at the location 400 of the second item 116. The server 106 can also be configured to receive, through the communication unit 304, a second verification signal 414 from the operator device 120 in response to the second image 406.

The first verification signal 414 from the operator device can be a rejection signal 416. If the item is not in the image, the verification signal can be a rejection signal, which can be a "No" or similar answer to a yes/no question, a "None of the above" or similar answer to a multiple-choice answer, or any negative text or audio response.

The server 106 can be configured to transmit, through the communication unit 304, the first image 404 of the first item 112 to another operator device when the first verification signal 414 is the rejection signal 416.

The server 106 can swap between different robots. The server 106 can swap between robots by cycling through the image feeds provided by the robots. For example, the server 106 can swap between a first video feed captured by the first image capture unit 408 of the first robot 102 and a second video feed captured by the second image capture unit 410 of the second robot 104.

The server 106 can be configured to transmit, through the communication unit 304, an approved image 416 of the first item 112 to the operator device 120, and receive, through the communication unit 304, the first verification signal 412 from the operator device 120 based on a comparison of the approved image 416 and the first image 404 of the first item 112. The approved image 416 of the first item 112 or the second item 116 can be images of the items stored in the memory 302 of the server 106. In another variation, the approved image 416 of the first item 112 or the second item 116 can be an image of the items approved by another operator device. The operator or item approval specialist is functioning as a quality control operator for picked items, and is attempting to match picked items with orders. The approval or rejection of picked items can be included as an element in a game, such as a contest, or a video game. The game can be limited to company employees as a technique for measuring employee productivity, or the game can be opened up to persons outside the company to provide help to the distribution company or picking services company.

Shipping an incorrect item is often costly for a business, so a reduction in incorrectly picked and shipped items can improve the bottom line of the business. The operator or item approval specialist can consult product images, specifications, UPC numbers, item numbers, item quantities, product weights, product sizes, chemical composition or any other product properties to make their determination of acceptance or rejection of the item. The item or items can be approved visually by the operator through viewing or processing, of an image or video, or via haptic/tactile feedback through feeling or processing texture, weight or consistency data. The item or items can also be approved by sensing or processing smell or sound of the item or items.

Figure 5:
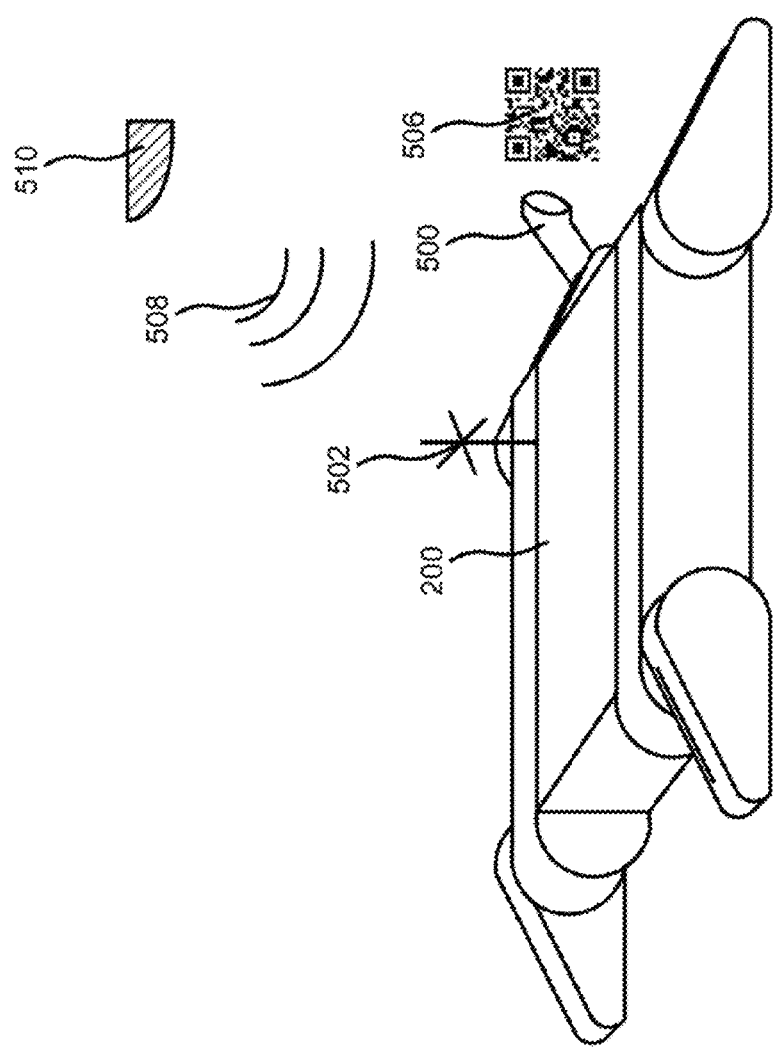
FIG. 5 illustrates readers and receivers of a robot.

FIG. 5 illustrates that the robot 200, including the first robot 102, the second robot 104, or a combination thereof, can have a reader 500, a beacon receiver 502, or a combination thereof. The reader 500 can be a quick response (QR) reader, a near-field communication (NFC) reader, a radio-frequency identification (RFID) reader, or a combination thereof. The reader 500 can read one or more identification codes 506 such as a QR code, scan code, a bar code, or a combination thereof. The reader 500 can also read a tag such as an NFC tag, an RFID tag, or a combination thereof.

In one variation, the reader 500 can be the image capture unit 206 or include the image capture unit 206. In such variations, the processors 202 can combine with the image capture unit 206 to serve as the reader 500. The robot 200 can read an identification code 506 in a storage environment such as the first storage environment 110, the second storage environment 114, or a combination thereof.

The beacon receiver 502 can be configured to detect a beacon signal 508 transmitted by a beacon transmitter 510. The beacon signal 508 can be a Bluetooth™ Low Energy (LE) signal, a proximity sensor signal, a sound wave, a radio-frequency signal or a combination thereof. In one variation, the beacon receiver 502 can be the communication unit 208 of the robot 200.

Figure 6:
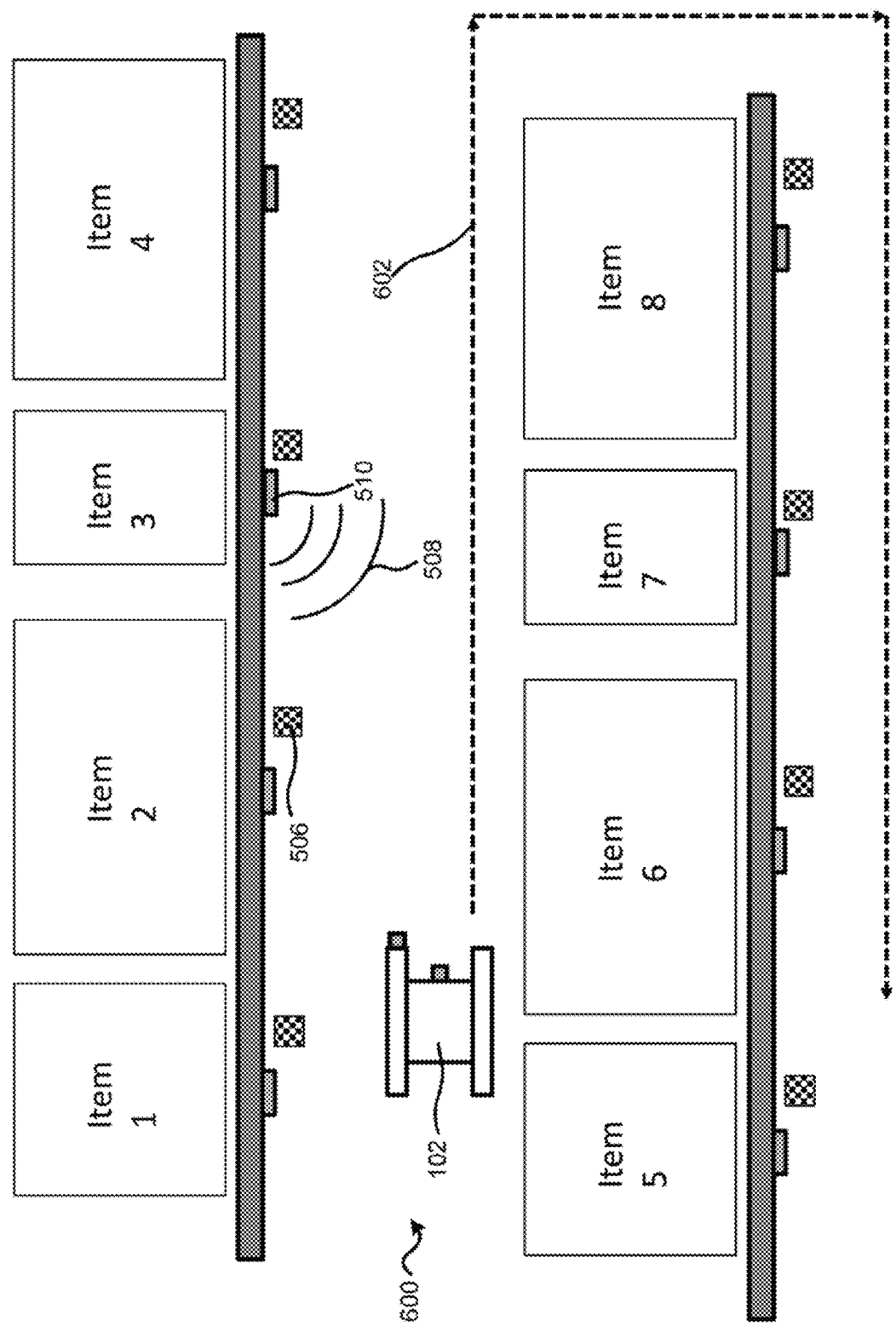
FIG. 6 illustrates navigation method of a robot.

FIG. 6 illustrates that the first robot 102, the second robot 104, or a combination thereof can navigate around a storage environment, such as the first storage environment 110 or the second storage environment 114, using the reader 500 and the beacon receiver 502.

The storage environment can include one or more aisles 600. The aisles 600 can be labeled by one or more identification codes 506. The first robot 102, the second robot 104, or a combination thereof can travel or navigate along the aisles 600 by reading the identification codes 506 labeling the aisles 600. The identification codes 506 can label the floor of the aisles 600, storage bins or shelves in the aisles 600, paths in between the aisles 600, or a combination thereof. In another variation, the identification codes 506 can be beacon signals 508 and the beacon receiver 502 of the first robot 102, the second robot 104, or a combination thereof can be detecting the beacon signals 508 emitted by the beacon transmitters 510 located along the aisles 600.

The first robot 102, the second robot 104, or a combination thereof can navigate along a fixed path 602 established by the identification codes 506, the beacon signals 508, or a combination thereof.

The server 106 can be configured to receive a reading of one identification code 506 from the first robot 102, and track, using the control unit 300, the position 402 of the first robot 102 based on the reading of the one identification code 506 relative to other instances of the identification codes 506 in the storage environment. The server 106 can also be configured to receive the beacon signal 508 detected by the first robot 102, and track the position 402 of the first robot 102 based on the beacon signal 508 relative to other beacon signals 508 emitted by other beacon transmitters 510 in the storage environment.

Figure 7:
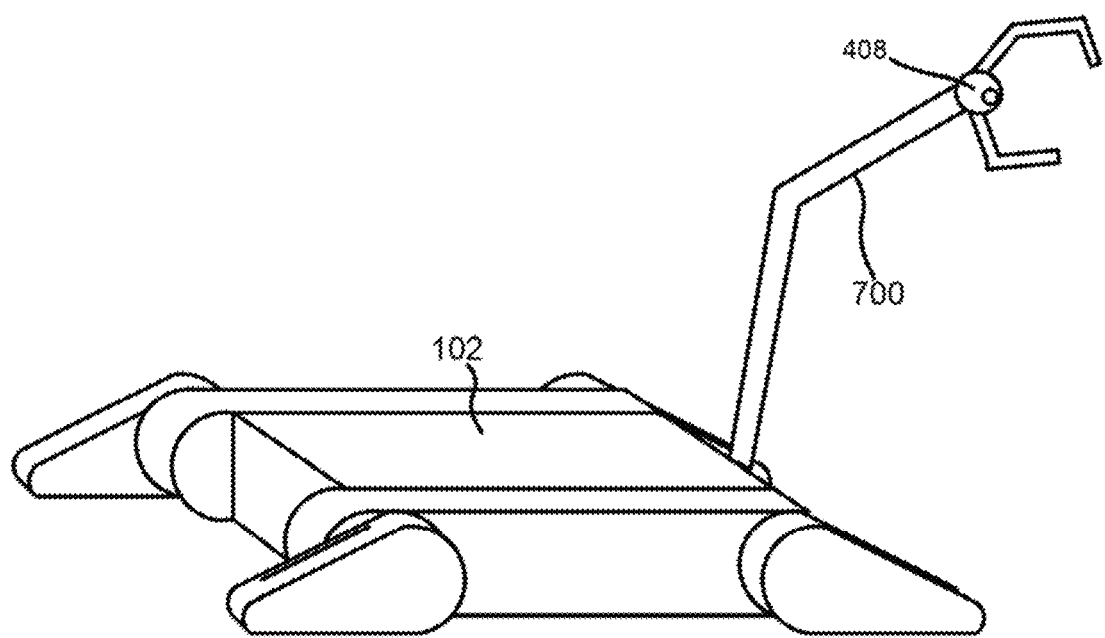
FIG. 7 illustrates a robot with an image capture unit on its end effector.

FIG. 7 illustrates that the first robot 102 can include an end effector 700 configured to retrieve an item such as the first item 112 and the first image capture unit 408 can be positioned on the end effector 700. The image capture unit captures data about items that can be picked by a robot. It can be placed on the end effector of the robot, on a separate image capture appendage, or on the body of the robot. The image capture units can also be in fixed locations in the storage environment, or mounted on mobile devices separate from the robots. The image capture unit can allow the robot to identify a type of item, or its position and orientation, or other navigation landmarks in the storage environment. This can allow the robot to find an item and acquire the item for transport to a secondary location.

Figure 8:
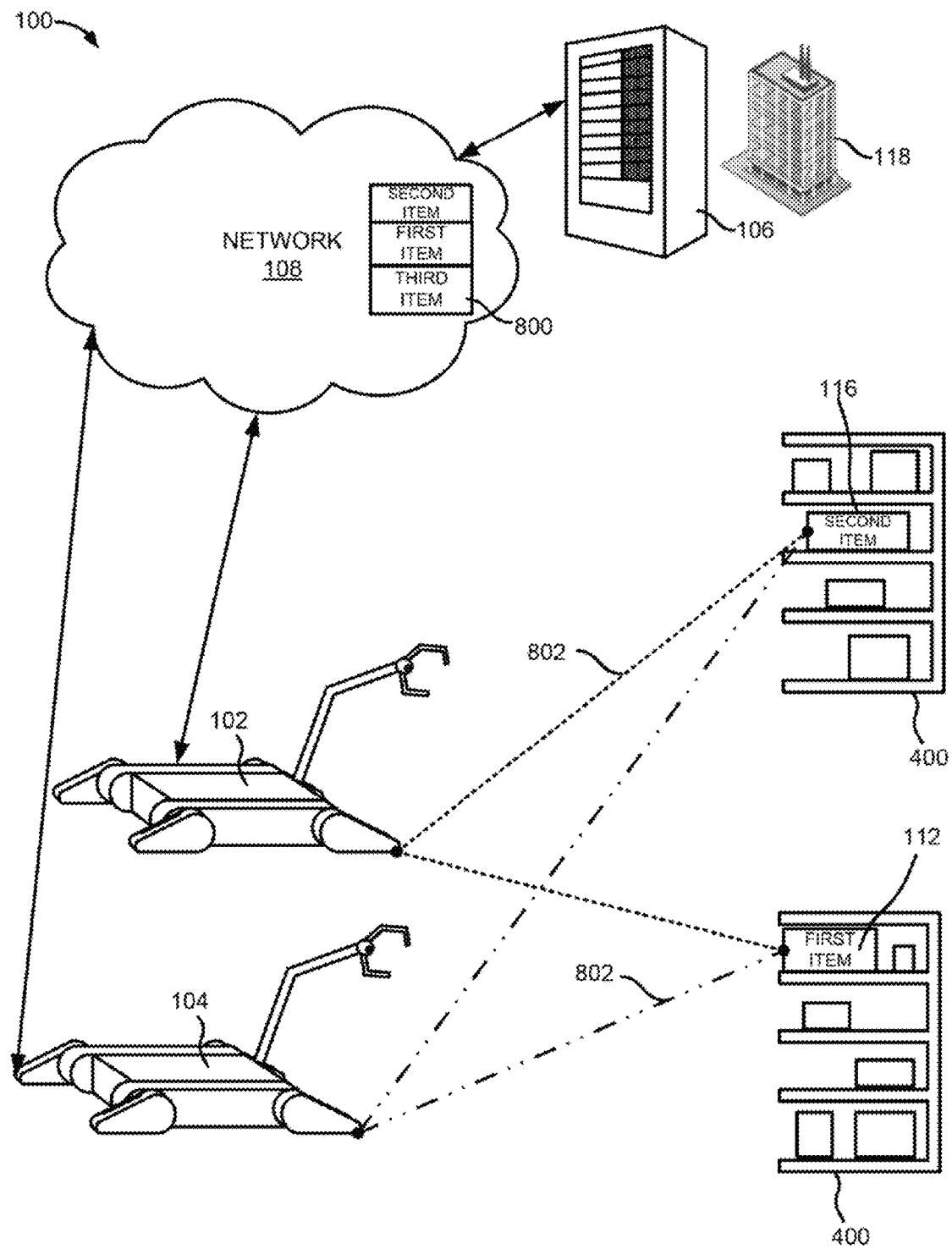
FIG. 8 illustrates a prioritization of orders by the robotic logistics system.

FIG. 8 illustrates that the server 106 can also be configured to determine, using the control unit 300, a priority level 800 of at least one of the first item 112 and the second item 116, calculate, using the control unit 300, a proximity 802 of the first robot 102 to at least one of the first item 112 and the second item 116 and the proximity 802 of the second robot 104 to at least one of the first item 112 and the second item 116, and transmit, through the communication unit 304, the location 400 of at least one of the first item 112 and the second item 116 to at least one of the first robot 102 and the second robot 104 based on the calculation of the proximity 800. Prioritization of the order items can take into account distance from each robot to each required item, number, weight or size of items that each robot can carry, speed of each robot, remaining battery life or remaining energy of each robot, or stock status of the items. Optimization algorithms can use these and other metrics to maximize delivery of items. This algorithm can maximize number of items picked, value of items picked, or profit from items picked. The algorithm can take into shipping methods and shipping cutoff times, to minimize costs from shipping by prioritizing orders that are more expensive to ship.

As an example, any new orders that come in with a same day shipping request are immediately picked by the nearest robot, and after all of the new orders for same day shipping are fulfilled, then robots get assigned picking for next day shipping until all such orders are picked, and then 3-5 day shipping orders, and so on until all orders have been picked. As a new order comes in, the highest priority in terms of shipping priority will supersede whatever lower priority order the nearest robot is picking, and the current order of that robot can be added back to the queue of items to pick and possibly be assigned to another robot. Additional prioritization parameters, such as orders originating from members (e.g. Costco membership, Sam's Club membership, Amazon Prime membership) can be included to optimize customer experience and delivery preferences.

The systems and methods of the disclosed embodiments and variations thereof can be embodied and/or implemented at least in pan as a machine having a computer-readable medium with stored computer-readable instructions. The instructions are preferably executed by computer-executable components preferably integrated with the system and one or more portions of the processors and/or the microcontrollers integrated into the system components. The computer-readable instructions can be stored on any suitable computer-readable media such as RAMs, ROMs, flash memory, EEPROMs, optical devices (e.g., CD or DVD), hard drives, floppy drives, or any suitable device. The computer-executable component is preferably a general or application-specific processor, but any suitable dedicated hardware or hardware/firmware combination can alternatively or additionally execute the instructions.

As used in the description and claims, the singular form "a", "an" and "the" include both singular and plural references unless the context dearly dictates otherwise. For example, the term "a boiler controller" may include, and is contemplated to include, a plurality of boiler controllers. At times, the claims and disclosure may include terms such as "a plurality," "one or more," or "at least one'," however, the absence of such terms is not intended to mean, and should not be interpreted to mean, that a plurality is not conceived.

The term "about" or "approximately," when used before a numerical designation or range (e.g. to define a length or pressure), indicates approximations which may vary by (+) or (−) 5%, 1% or 0.1%. All numerical ranges provided herein are inclusive of the stated start and end numbers. The term "substantially" indicates mostly greater than 50%) or essentially all of a device, substance, or composition.

As used herein, the term "comprising" or "comprises" is intended to mean that the devices, systems, and methods include the recited elements, and may additionally include any other elements. "Consisting essentially of" shall mean that the devices, systems, and methods include the recited elements and exclude other elements of essential significance to the combination for the stated purpose. Thus, a system or method consisting essentially of the elements as defined herein would not exclude other materials, features, or steps that do not materially affect the basic and novel characteristic(s) of the claimed invention. "Consisting of" shall mean that the devices, systems, and methods include the recited elements and exclude anything more than a trivial or inconsequential element or step. Embodiments defined by each of these transitional terms are within the scope of this disclosure.

The examples and illustrations included herein show, by way of illustration and not of limitation; specific embodiments in which the subject matter may be practiced. Other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A robotic logistics system, comprising:
a first robot comprising a first image capture unit;
a second robot comprising a second image capture unit;
a server comprising a control unit coupled to a communication unit, wherein the server is configured to:
transmit, through the communication unit, a location of a first item to the first robot and the location of a second item to the second robot;
track, using the control unit, a position of the first robot relative to the first item and the position of the second robot relative to the second item;
transmit, through the communication unit, a first image of the first item captured by the first image capture unit to an operator device when the first robot arrives at the location of the first item;
receive, through the communication unit, a first verification signal from the operator device in response to the first image;
transmit, through the communication unit, a second image of the second item captured by the second image capture unit to the operator device when the second robot arrives at the location of the second item; and
receive, through the communication unit, a second verification signal from the operator device in response to the second image;
wherein the operator device is a consumer mobile communication device.

2. The system of claim 1, wherein:
the first robot further comprises a reader configured to read an identification code in a storage environment;
the server is further configured to:
receive, through the communication unit, a reading of the identification code from the first robot, and
track, using the control unit, the position of the first robot based on the reading of the identification code relative to other instances of the identification code in the storage environment.

3. The system of claim 1, wherein:
the first robot further comprises a beacon receiver configured to detect a beacon signal emitted by a beacon transmitter in a storage environment;
the server is further configured:
receive, through the communication unit, the beacon signal detected by the first robot, and
track, using the control unit, the position of the first robot based on the beacon signal relative to other beacon signals emitted by other beacon transmitters in the storage environment.

4. The system of claim 1, wherein:
the first verification signal from the operator device is a rejection signal; and
the server is further configured to transmit, through the communication unit, the first image of the first item to another operator device.

5. The system of claim 1, wherein the server is further configured to:
transmit, through the communication unit, an approved image of the first item to the operator device, and
receive, through the communication unit, a verification signal from the operator device based on a comparison of the approved image and the first image of the first item.

6. The system of claim 1, wherein the server is further configured to:
  determine, using the control unit, a priority level of at least one of the first item and the second item;
  calculate, using the control unit, a proximity of the first robot to at least one of the first item and the second item and the proximity of the second robot to at least one of the first item and the second item; and
  transmit, through the communication unit, the location of at least one of the first item and the second item to at least one of the first robot and the second robot based on the calculation of the proximity.

7. The system of claim 1, wherein the first item and the first robot are located in a first storage environment and the second item and the second robot are located in a second storage environment geographically separated from the first storage environment.

8. The system of claim 1, wherein the server is located in a server location and the operator device is located in an operator location geographically separated from the server location.

9. The system of claim 1, wherein:
  the server is located in a server location, the first item and the first robot are located in a first storage environment, the second item and the second robot are located in a second storage environment, and the operator device is located in an operator location, and
  the server location, the first storage environment, the second storage environment, and the operator location are geographically separated from one another.

10. The system of claim 1, wherein the first robot further comprises an end effector configured to retrieve the first item and wherein the first image capture unit is positioned on the end effector.

11. A robotic logistics system, comprising:
  a first robot comprising a first image capture unit;
  a second robot comprising a second image capture unit;
  a server comprising a control unit coupled to a communication unit, wherein the server is configured to:
  transmit, through the communication unit, a location of a first item to the first robot and the location of a second item to the second robot;
  track, using the control unit, a position of the first robot relative to the first item and the position of the second robot relative to the second item;
  transmit, through the communication unit, a first image of the first item captured by the first image capture unit to an operator device when the first robot arrives at the location of the first item;
  receive, through the communication unit, a first verification signal from the operator device in response to the first image;
  transmit, through the communication unit, a second image of the second item captured by the second image capture unit to the operator device when the second robot arrives at the location of the second item; and
  receive, through the communication unit, a second verification signal from the operator device in response to the second image
  wherein the server is further configured to:
  determine, using the control unit, a priority level of at least one of the first item and the second item;
  calculate, using the control unit, a proximity of the first robot to at least one of the first item and the second item and the proximity of the second robot to at least one of the first item and the second item; and
  transmit, through the communication unit, the location of at least one of the first item and the second item to at least one of the first robot and the second robot based on the calculation of the proximity; and
  wherein the priority level of at least one of the first item and the second item is determined from the relative profitability of a transaction for the purchase of the first item and the relative profitability of a transaction for the purchase of the second item.

12. A robotic logistics system, comprising:
  a first robot comprising a first image capture unit;
  a second robot comprising a second image capture unit;
  a server comprising a control unit coupled to a communication unit, wherein the server is configured to:
  transmit, through the communication unit, a location of a first item to the first robot and the location of a second item to the second robot;
  track, using the control unit, a position of the first robot relative to the first item and the position of the second robot relative to the second item;
  transmit, through the communication unit, a first image of the first item captured by the first image capture unit to an operator device when the first robot arrives at the location of the first item;
  receive, through the communication unit, a first verification signal from the operator device in response to the first image;
  transmit, through the communication unit, a second image of the second item captured by the second image capture unit to the operator device when the second robot arrives at the location of the second item; and
  receive, through the communication unit, a second verification signal from the operator device in response to the second image
  wherein the server is further configured to:
  determine, using the control unit, a priority level of at least one of the first item and the second item;
  calculate, using the control unit, a proximity of the first robot to at least one of the first item and the second item and the proximity of the second robot to at least one of the first item and the second item; and
  transmit, through the communication unit, the location of at least one of the first item and the second item to at least one of the first robot and the second robot based on the calculation of the proximity; and
  wherein the priority level of at least one of the first item and the second item is determined from the membership status of a purchaser of the first item and the membership status of the purchaser of the second item.

13. A robotic logistics system, comprising:
  a first robot comprising a first image capture unit;
  a second robot comprising a second image capture unit;
  a server comprising a control unit coupled to a communication unit, wherein the server is configured to:
  transmit, through the communication unit, a location of a first item to the first robot and the location of a second item to the second robot;
  track, using the control unit, a position of the first robot relative to the first item and the position of the second robot relative to the second item;
  transmit, through the communication unit, a first image of the first item captured by the first image capture unit to an operator device when the first robot arrives at the location of the first item;
  receive, through the communication unit, a first verification signal from the operator device in response to the first image;

transmit, through the communication unit, a second image of the second item captured by the second image capture unit to the operator device when the second robot arrives at the location of the second item; and receive, through the communication unit, a second verification signal from the operator device in response to the second image wherein the server is further configured to:

determine, using the control unit, a priority level of at least one of the first item and the second item;

calculate, using the control unit, a proximity of the first robot to at least one of the first item and the second item and the proximity of the second robot to at least one of the first item and the second item; and transmit, through the communication unit, the location of at least one of the first item and the second item to at least one of the first robot and the second robot based on the calculation of the proximity; and wherein the priority level of at least one of the first item and the second item is determined from a shipping cutoff deadline.

14. The system of claim 13, wherein the shipping cutoff deadline for the first item is after the shipping cutoff deadline for the second item, and wherein the second item is assigned a higher priority than the first item.

15. A robotic logistics system, comprising:
a first robot comprising a first image capture unit;
a second robot comprising a second image capture unit;
a server comprising a control unit coupled to a communication unit, wherein the server is configured to:
transmit, through the communication unit, a location of a first item to the first robot and the location of a second item to the second robot;
track, using the control unit, a position of the first robot relative to the first item and the position of the second robot relative to the second item;
transmit, through the communication unit, a first image of the first item captured by the first image capture unit to an operator device when the first robot arrives at the location of the first item;
receive, through the communication unit, a first verification signal from the operator device in response to the first image;
transmit, through the communication unit, a second image of the second item captured by the second image capture unit to the operator device when the second robot arrives at the location of the second item; and
receive, through the communication unit, a second verification signal from the operator device in response to the second image;
wherein the first robot further comprises an end effector configured to retrieve the first item and wherein the first image capture unit is positioned on the robot to provide a view of the end effector and the first item.

16. The system of claim 15, wherein the first image capture unit provides an image input to the control unit, and wherein the control unit uses the image input to determine a location of the first robot.

17. A robotic logistics system, comprising:
a first robot comprising a first image capture unit;
a second robot comprising a second image capture unit;
a server comprising a control unit coupled to a communication unit, wherein the server is configured to:
transmit, through the communication unit, a location of a first item to the first robot and the location of a second item to the second robot;
track, using the control unit, a position of the first robot relative to the first item and the position of the second robot relative to the second item;
transmit, through the communication unit, a first image of the first item captured by the first image capture unit to an operator device when the first robot arrives at the location of the first item;
receive, through the communication unit, a first verification signal from the operator device in response to the first image;
transmit, through the communication unit, a second image of the second item captured by the second image capture unit to the operator device when the second robot arrives at the location of the second item; and
receive, through the communication unit, a second verification signal from the operator device in response to the second image;
wherein the operator device is a point of sale terminal.

18. The system of claim 17, wherein the first robot further comprises an end effector configured to retrieve the first item and wherein the first image capture unit is positioned on the end effector.

19. A robotic logistics system, comprising:
a first robot comprising a first image capture unit;
a second robot comprising a second image capture unit;
a server comprising a control unit coupled to a communication unit, wherein the server is configured to:
transmit, through the communication unit, a location of a first item to the first robot and the location of a second item to the second robot;
track, using the control unit, a position of the first robot relative to the first item and the position of the second robot relative to the second item;
transmit, through the communication unit, a first image of the first item captured by the first image capture unit to an operator device when the first robot arrives at the location of the first item;
receive, through the communication unit, a first verification signal from the operator device in response to the first image;
transmit, through the communication unit, a second image of the second item captured by the second image capture unit to the operator device when the second robot arrives at the location of the second item; and
receive, through the communication unit, a second verification signal from the operator device in response to the second image;
wherein the operator device is a video game terminal.

20. The system of claim 19, wherein the first robot further comprises an end effector configured to retrieve the first item and wherein the first image capture unit is positioned on the end effector.

* * * * *